United States Patent [19]

Watkins et al.

[11] 4,283,423

[45] Aug. 11, 1981

[54] FREE-FLOWING GRANULAR UREA NUTRIENT SUPPLEMENTS

[75] Inventors: Kenneth R. Watkins, Wheaton; Michael L. Bolind, Des Plaines, both of Ill.

[73] Assignee: United States Gypsum Company, Chicago, Ill.

[21] Appl. No.: 67,976

[22] Filed: Aug. 20, 1979

[51] Int. Cl.³ .......................... A23K 1/00; A23K 1/22
[52] U.S. Cl. ........................................ 426/69; 426/74; 426/623; 426/630; 426/635; 426/517; 426/518; 426/807
[58] Field of Search .................... 426/69, 807, 74, 623, 426/630, 636, 517, 518, 519; 71/28, 29, 53, 64 B, 64 D, 64 DC, 64 SC

[56] References Cited

U.S. PATENT DOCUMENTS

| | | | |
|---|---|---|---|
| 1,977,628 | 10/1934 | Hall | 71/28 |
| 2,569,282 | 9/1951 | Block | 426/69 |
| 3,419,379 | 12/1968 | Goodale et al. | 71/60 |
| 3,820,970 | 6/1974 | Watkins | 71/64 DC X |

*Primary Examiner*—R. B. Penland
*Attorney, Agent, or Firm*—Kenneth E. Roberts; Robert H. Robinson; S. Kurlandsky

[57] ABSTRACT

A homogeneous, free-flowing urea containing composition which has particular utility as an animal feed supplement or a fertilizer material and an improved process for preparing same are disclosed. In the process urea and particular forms of calcium sulphate are intimately mixed, optionally with calcium phosphate and one or more desired additives, and pelletized or granulated as by compression compaction. In one embodiment, micronutrients are blended into the urea-calcium sulphate mixture before compaction and the granules so produced may be subsequently utilized as a fertilizer supplement or in combination with primary nutrients as a complete fertilizer. In a second embodiment, the urea-calcium sulphate constitute an animal feed supplement to be blended with other, non-hygroscopic, nutrients such as calcium phosphate and the like in forming a silage or complete animal feed.

5 Claims, 1 Drawing Figure

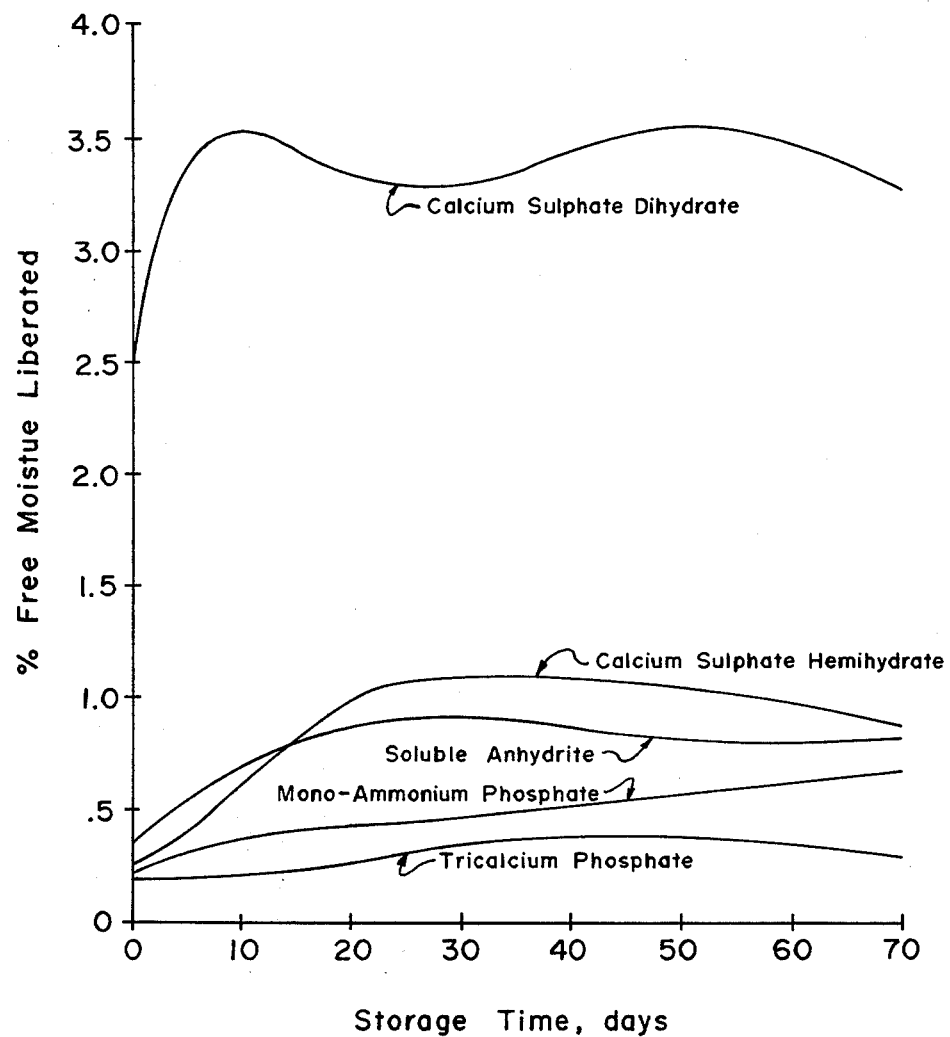

FREE-FLOWING GRANULAR UREA NUTRIENT SUPPLEMENTS

BACKGROUND OF THE INVENTION

1. Field of the Invention

This invention relates to plant nutrient supplements and animal feed supplements and to a process for preparing same. More particularly, the invention relates to such products and an improved process for preparing a substantially free-flowing and non-caking particulate urea-calcium sulphate nutrient supplement which is readily blended with one or more nutrients to provide fertilizers or animal feeds.

2. Description of the Prior Art

Plant nutrients can be classified as primary plant nutrients (sources of nitrogen, phosphorous and potassium the last mentioned being measured as $K_2O$); secondary plant nutrients (sources of calcium, magnesium and sulfur); and micronutrients (such as copper, zinc, boron, iron, manganese, molybdenum and the like). Fertilizer nitrogen (hereinafter N) is normally provided by ammonia, ammonium salts such as ammonium nitrate, or urea. Fertilizer phosphate (hereinafter P and measured as $P_2O_5$) is normally provided by phosphoric acid, ammonium phosphates, and super phosphates.

For certain fertilizer and animal feed formulations, it is often desirable to incorporate urea along with a phosphate compound such as dicalcium phosphate or monoammonium phosphate and to include calcium and sulfur. Dicalcium phosphate is the most common source of phosphate used in animal feed preparations, and monoammonium phosphate is widely used in fertilizer formulations. Gypsum (calcium sulphate dihydrate or land plaster) is frequently used in both formulations as a calcium source, a sulfur source or both.

In recent years in the animal feeding area, it is becoming accepted to substitute urea (a non-protein nitrogen) for a portion of preformed protein in formulating diets for ruminants, particularly cattle since they are able to synthesize essential sulfur containing amino acids from inorganic sulfur and urea. There has further been a tendency to use higher levels of urea and an increasing interest in using gypsum in feeding these animals.

However, as is well known in the art, urea is very water soluble and is quite hygroscopic; and urea-gypsum and urea-phosphate mixtures have a history of handling problems. Urea, whether marketed in the form of crystals or prills has a great tendency to cake and form a rigid mass when stored for any significant period of time. Thus, the fertilizer manufacturer, the feed lot operator and the ultimate consumer must crush or otherwise break up this mass before the urea can be combined with other animal feed ingredients or fertilizer ingredients or before the blended products can be used for their intended purposes. Further urea prills are of such large size that they must be intimately ground for thorough blending with animal feed ingredients to avoid "wetting out" in feed pellets and other problems. When the urea is co-ground, or simply mixed, with hydrated compounds having loosely bound water of crystallization such as dicalcium phosphate, monocalcium phosphate, or gypsum for blending or granulation processing, the urea dehydrates these materials. That is, the urea reacts with and liberates the bound water from these compounds, thereby wetting out the mixtures, even when the compounds are present in dried powder or particulate form, and consequently results in the formation of new adduct compounds. These mixtures then have poor storage properties, i.e., they become wet and soft, and caking results from the adduct interaction. Thus additional time and labor is required in order to render the material suitable for even distribution in formulation or application. Additionally, the materials tend to segregate during handling and storage, thus requiring additional time and labor in remixing to form a homogeneous mixture.

Various methods have been proposed for avoiding some of the above noted caking and related handling problems with urea. One prior proposal involves "dusting" a conditioning agent onto the urea (such as starch, clays, calcium sources as recited in the background of U.S. Pat. No. 3,332,827) or the in situ coating of completed fertilizers containing urea with calcium phosphates or calcium sulphates (U.S. Pat. No. 3,419,379). Other proposals involve the intentional formation of the various addition complexes or ostensible alternating coatings of addition complex ingredients together with high temperature processing in order to form hard outer shells to the granules (U.S. Pat. Nos. 2,074,880; 3,085,870 and 3,585,043 and also 1,977,628 prior to prilling of the urea). Although many such proposals have been made, none has proved entirely satisfactory. Thus, granules formed by mixing the materials and then prilling the urea have been weak and readily disintegrating to powders in handling or processing them. The use of addition complexes not only requires added production equipment, but the hard granules produced from such mixtures have poor storage properties and frequently upset the delicate balance of blending nutrient sources such that a complete animal feed or fertilizer of properly balanced source materials cannot result. Usually the complex salts formed from urea admixtures in fertilizer and animal feed products are more hygroscopic than urea alone. The concept of alternative coatings suffers from the detriment of still being hygroscopic, and caking results. Gypsum-urea addition complexes that are less hygroscopic are likely to contain too much sulfur source to be utilized for animal feed supplements or secondary plant nutrient addition; and when the ratios are adjusted to provide optimum N:S ratios, the resultant process mixtures produced by pelletizing and granulating cakes almost as severely as urea alone. For example a 10N:1S ratio prepared from a urea:gypsum mixture has been found to cake just as badly as does the urea alone. Other addition complexes that are less hygroscopic than urea alone may have lower melting points, such that additional processing can cause a complete gumming up and stoppage of the processing line.

SUMMARY OF THE INVENTION

It is therefore one object and advantage of the present invention to provide urea-calcium sulphate nutrient supplements in granular form, which granules are homogeneous mixtures of the nutrient sources and free-flowing in character.

Another object is the provision of free-flowing urea-calcium sulphate containing compositions which have particular utility as an animal feed supplement.

A further object is the provision of free-flowing urea-calcium sulphate containing compositions which have particular utility as a fertilizer supplement.

Still another object is the provision of a process for the production of urea-calcium sulphate nutrient supplements in improved, homogeneous, free-flowing granular form.

In U.S. Pat. No. 3,820,970 there is disclosed a process for producing a hard, scarcely dusty, gypsum dihydrate granule by compaction granulation of calcium sulphate dihydrate with a mixture of calcium sulphate hemihydrate and water to act as binder. Then the blend of gypsum, plaster and water are compacted at pressures of about 1,000–2,000 lbs. per square inch to form granules to which may be added various nutrients. It was surprisingly found in the present invention that a urea-calcium sulphate granule could be prepared by such compaction granulation using calcium sulphate hemihydrate or anhydrite without any water for lubricity and wet binding and which granule would not be wet or suffer caking if materials containing water of crystallization and/or entropic character with urea were largely avoided.

Thus the fulfillment of the above and other objects and advantages of the present invention are accomplished in one preferred embodiment for producing a complete fertilizer containing primary, secondary and micronutrients for plant growth by the steps of (1) dry blending, as major ingredients, calcium sulphate hemihydrate or anhydrite, urea, tricalcium phosphate and potassium sulphate; and as minor ingredients chelated or inorganic sulphate salt forms of iron, manganese, zinc and copper; (2) grinding the blended dry ingredients; (3) dry compacting the blended dry ingredients into a sheet; and then finally crushing the material to the desired granular size, such as to the size of commercial fertilizer granules (all passing a 6 U.S. Standard mesh and all retained on an 18 U.S. Standard mesh screens).

In another preferred embodiment, for producing an animal feed supplement, the present invention may be exemplified by (1) dry blending, as major ingredients, urea as a non-protein nitrogen substitute for natural protein; a material as a source of dietary soluble sulfur selected from the group consisting essentially of calcium sulphate hemihydrate and calcium sulfate anhydrite; and one or more materials as a phosphate source such as monoammonium phosphate but essentially including tricalcium (defluorinated) phosphate; (2) grinding the blended dry ingredients; (3) dry compacting the blended dry ingredients into a sheet; and (4) then finally crushing and screening the compacted material to the desired granular size, generally all passing a 16 but retained on a 60 U.S. Standard mesh screen for subsequent combining with grains and other usual constituents in the blending of a complete ration animal feed or a silage.

The product thus achieved is nutritionally balanced to provide primary, secondary and micronutrients in the case of the plant fertilizer and usable nitrogen, sulfur, calcium and phosphate supplements in a concentrate for formulating a silage additive or a complete growing ration animal feed. It is also quite likely that with the increased amount of urea incorporated in the animal feed supplement in combination with the appropriate balance of sulfur, that there will be the considerable added benefit of increased bioavailability and gradual sustained release of these elemental materials following ingestion into the stomach of ruminant animals.

BRIEF DESCRIPTION OF THE DRAWINGS

The FIGURE is a graphic representation of the percentage by weight of free moisture liberated over a period of time for a mixture of urea and various calcium and phosphate compounds.

DESCRIPTION OF THE PREFERRED EMBODIMENTS

Urea is such a hygroscopic material and the adducts and addition complexes formed between urea and various calcium and phosphate materials are so utropic in lowering of melt point that it was highly surprising in the present process to be able to process the materials without the compaction granulation processing equipment becoming a sticky mess unable to formulate discrete granules, and further, that the resultant granules were free flowing and not subject to excessive caking and moisture pick-up on storage.

Urea for use in the present invention may be the crystalline powder form if available. However the prilled urea form is more commonly available and will generally be used. When using the prilled form, the prill aggregates are usually of such size in comparison to the other ingredients in the final granule of the present invention that the urea granules should be ground to a size of about 100% passing 100 U.S. Standard mesh sieve in order to avoid localized concentrations of urea in the final granular product which might provide a toxicity problem to ruminent animals. The amount of urea ingredient is highly variable depending primarily upon the amount of nitrogen value that is desired for the particular product and to a lesser degree upon the granulation conditions of relative humidity and temperature by friction during granulation. The upper level of urea addition is not known at the present time but it is known that more that 50% by weight of the granules can be constituted by urea even when processing the granule by pressure roll compaction under highly humid midwestern summer conditions.

The calcium sulphate ingredients take the form of either calcium sulphate hemihydrate or calcium sulphate anhydrite. For reasons of availability, the calcium sulphate hemihydrate, commonly known and commercially available under the terms "stucco" or "plaster" will be the form utilized. The anhydrite material may also be utilized and is commercially available in forms low in fluoride suitable for use in animal feed supplements under the trade name SNOW WHITE filler FDA Grade; and other grades may be utilized for fertilizer usage. The amounts of stucco or anhydrite that may be utilized are also highly variable depending upon the particular amount of urea present and the desired N:S, N:Ca:S or N:S:P ratio for the particular product. Thus in animal feed supplements where generally around a 10N-1S ratio is desired for ruminants and the amount of urea is for example variable from 20 to 60% or more by weight of the granule, the stucco will vary from about 5 to 15% by weight of the granule. The anhydrite would be used in slightly lesser amounts than the stucco to achieve the same efficacy and maintain the same N:S ratios. The same holds true for fertilizers and fertilizer supplements.

The phosphate ingredient in the compositions of the the present invention, if present, will include tribasic calcium phosphate (herein TCP) also known as tricalcium orthophosphate and available commercially as defluorinated calcium phosphate rock. The monobasic, and especially dibasic calcium phosphate (the latter herein called "dical") should be avoided in any substantial amounts in the formulations as containing water of crystallization and readily forming hygroscopic adducts with the urea. Either monobasic or dibasic ammonium phosphate may also be utilized in part (or to some degree, i.e., 40%) in combination with defluorinated phosphate rock even though monobasic ammonium phosphate (MAP) is very hygroscopic in combinations with urea.

Additional nutrient ingredients as well known in the art among the primary, secondary, trace and micronutrients are included in the customary amounts for making various supplements to ultimately be blended with other nutrient ingredients such as silage, seed etc. in the making of animal feed rations or as complete fertilizers.

Of course, the above considerably depends upon the particular biologically active composition being prepared. In the animal feed supplement area, formulations are generally concerned with a nitrogen to sulfur ratio of preferably 10:1, although generally ratios of about 8:1 to 12:1 will be satisfactory depending upon the other additives for a complete ration. It has been found that processing and handling problems do not start to occur if less than 10% urea is included in the formulation, but that such problems do occur when more than about 10% urea is included in the formulation. Frequently, however the problem is compounded by the desirability to maintain a minimum nitrogen content as a secondary requirement by the formulator, e.g., frequently a 20-25% nitrogen content (generally satisfied by a 50-60% urea content) will be specified. In general, it is believed that a supplement in the general range of about 8:1 to 15:1 nitrogen to sulfur ratio and comprising only the urea and either calcium sulphate hemihydrate or anhydrite will provide compositions achieving the objectives of the present invention at urea levels from about 10% to about 30% or more. It is further frequently desired to include a phosphate nutrient in such supplements and it is believed in compositions of the present invention that the inclusion of the tricalcium phosphate acts as a diluent separating the particles of urea from the particles of the calcium sulphate, particularly at higher urea content formulations. Thus, further satisfactory compositions of the present invention may be provided in the same ratios of nitrogen to sulfur at higher urea contents by the inclusion of the tricalcium phosphate, e.g., for about 30-60% urea or more content formulations, a satisfactory composition will comprise as "major" ingredients urea, tricalcium phosphate and either calcium sulphate hemihydrate or anhydrite. By the term "major" is meant amounts of about 10% and upwards. Of course the particular amount of any one of the three ingredients will depend upon the particular N:Ca:P:S ratio desired for the particular product.

With regard to the plant nutrient type of biologically active compositions it has now been found that not only is the urea a highly hygroscopic material creating both adduct and hygroscopicity problems with gypsum dihydrate but that the commonly used chelated forms of micronutrients are as much of a problem as the dihydrate form of the gypsum. Chelates, particularly with lignosulfonate bases are extremely hygroscopic, it has been found, and tend to make urea containing fertilizer compositions even wetter than would otherwise be the case after the urea has pulled moisture out of the air. It is believed that a plant nutrient supplement containing only urea and calcium sulphate probably does not require the practice of the present invention if less than about 10% of urea is present. When more than 10% urea, i.e., 15%-60% urea is present or when about 10% urea and 10% or more of chelated micronutrients are present, then such handling problems and stickiness will be encountered as to make it highly advantageous to use the hemihydrate or the anhydrite form of calcium sulphate. Again, as amounts of urea increase above about 30% or chelated micronutrients are present it is further desirable to add major amounts of the tricalcium phosphate to act as a dispersant in avoiding adduct formations between the hemihydrate or anhydrite and urea. Of course, again the amounts will be highly variable depending upon the particular N:P:K:S:Fe;Mg:Cu, etc. desired.

In forming the granules of the present invention, the various materials are dry blended and dry agglomerated. When the urea ingredient is in the form of prills, or large granular forms, generally it is preferred that the blending of components be accompanied with grinding to assure a thorough and homogeneous intermixing of the urea and finely powdered calcium sulphate ingredients. It has been found satisfactory to grind all of the materials to such that 100% passes 100 U.S. Standard mesh and 10% is retained on 325 U.S. Standard mesh.

For granulation it is preferred that the dry blended mix be pressure roll compacted into a thin sheet and the sheet broken up into flakes and granules of desired size. Generally pressure roll compaction at roll pressures of about 1,000-2,100 psi may be utilized with 24 rpm and about 1800 psi generally being preferred. The urea ingredient is a low melt point material and light pressures and high roll speeds are generally preferred to avoid a stickiness problem when too much of the urea becomes molten by heat and pressure. The pressure and roll speeds given above generally provide an internal temperature to the mixture during compaction/granulation of 160° to 225° F. which provides binding of the ingredients together without substantial sticking problems and results in a hard, free-flowing granule.

In order that those skilled in the art may better understand the compositions of the present invention and the method in which they are formed and used, the following specific examples are given.

Example 1

Various powdered mixtures of urea with a calcium source or a phosphate source material were combined and evaluated for free moisture content during storage in sealed bags.

For this evaluation soluble calcium sulphate anhydrite, calcium sulphate hemihydrate, and ground gypsum rock (calcium sulphate dihydrate) were evaluated as calcium sources; and monoammonium phosphate (MAP, of 10N-5OP$_2$O$_5$ ratio), dicalcium phosphate (dical, of 18P) and defluorinated rock phosphate (tricalcium phosphate, TCP, of 18% P and 41.22% P$_2$O$_5$ assay) were combined with urea and evaluated as phosphate sources. The urea was prilled urea of 45% nitrogen assay. All materials were commercial products except the soluble anhydrite which was made by calcining the calcium sulphate hemihydrate first at 220° C. for 8 hours followed by 150° C. for 8 hours and finally 220° C. for 4 additional hours. The respective calcium sulphate or calcium phosphate material was blended for five minutes with the prilled urea in weight proportions of 35% urea and 65% of the other material in a grinding Raymond blender operated at 77° F. and 43% relative humidity.

The mixture of urea with dicalcium phosphate became wet during grinding, blocking the grinder screen and caking the grinder chamber. It was therefore eliminated from further evaluations. The blend of urea and monoammonium phosphate became warm with grinding and did not flow easily but was processable. All of the remaining mixtures blended easily.

Each of the blended mixes were tested for free moisture before blending by drying the materials at 40° C. for 2 hours and determining, as percent free moisture, the weight lost from the sample on drying. Each sample was then divided into 6 portions which were each stored in sealed plastic bags and then removed at the interval shown in Table 1 and evaluated again for free moisture, with the results as shown in Table 1.

The results of Table 1 are set forth graphically in the figure.

TABLE I

| Blend of urea and: | Blending | Percentage Free Moisture at storage time of | | | |
|---|---|---|---|---|---|
| | | 7 days | 22 days | 44 days | 72 days |
| 1. Soluble calcium sulphate anhydrite | .29 | .59 | .83 | .84 | .82 |
| 2. Calcium sulphate hemihydrate | .24 | .45 | 1.06 | 1.05 | .80 |
| 3. Calcium sulphate dihydrate | 2.32 | 3.48 | 3.37 | 3.51 | 3.23 |
| 4. Defluorinated tricalcium phosphate | .19 | .19 | .24 | .34 | .26 |
| 5. Monoammonium phosphate | .20 | .33 | .42 | .51 | .66 |

EXAMPLE 2

As set forth in Table 2, a number of fertilizer formulations were made and evaluated for processability, and then some were further evaluated for efficacy as fertilizer or fertilizer supplement.

In comparing formulations #1-3, formulation #1 encountered very severe processing difficulties during compaction granulation even though the calcium source was changed from the dihydrate containing two molecules of combined water to the hemihydrate containing one half molecule of chemically combined water per calcium sulphate molecule because of the presence of large amounts of chelated micronutrients. In formulation #2, even though less urea was utilized, the presence of calcium sulphate dihydrate resulted in severe processing problems. Small scale processing with a switch to formulation #3 shows that all processing problems will be eliminated.

Formulations #4 and #5 further show the effect of chelated micronutrients in a monoammonium phosphate-urea based fertilizer. Even though #5 utilized the hemihydrate form of calcium sulphate, with the increased amount of urea and large quantities of chelated micronutrients, this formulation was more difficult to process and encountered more sticking and more caking problems than formulation #4. Small scale processing with formulation #3 establishes that a similar reformulation with inorganic form micronutrients and TCP or MAP will overcome processing problems encountered with #5.

In another comparison, a nitrogen and iron fortified gypsum fertilizer supplement was made in formualtion #7 and compared to a commercial gypsum soil conditioner (formulation #6) for ease of application and effect on plant growth. Formulation #7 provides a 4.6N-0.6Fe-16Ca supplement which supplies iron for chloroplast development and prevention of chlorosis manifested as yellowing of the main plant parts. This was applied to a test plot along with a commercial gypsum dihydrate granule. Results are set forth in Table 3. No problems were encountered in making or spreading either #6 or #7 with rotory broadcast spreading equipment. Had more urea or micronutrient in chelate form augmentation been provided, formulation #7 would require the use of a calcium sulphate material of the invention for processing and spreading.

In commenting further on processability of certain of the formulations, production trials of formulation #1 had to be stopped because of sticking. Formulation #3 was produced over 4 different days under conditions of temperature and humidity varying from 70° F. and 49% relative humidity to 78° F. and 80% relative humidity by blending the dry ingredients and then compaction granulation of the dry mix without any liquid additives in a pressure roll compactor at various pressure settings but generally around 1600 pounds per square inch to produce a sheet of compacted material. The sheet was then broken into flakes and the flakes ground into granules generally to a size of 8 by 18 mesh. In general the ingredients blended well without sticking and the mix compacted very well at pressures between 1400 p.s.i. and 1600 p.s.i. If the compaction pressure was higher than about 2200 p.s.i. the flakes became heated and darker in coloration, generally indicative of the beginning of complex formation and/or a melting situation which could lead to stickiness problems. After 4 weeks storage in sealed vapor barrier bags the material of formulation #3 was free flowing and was easy to spread.

In comparison, formulation #2 was processed at 90° F. and 77% relative humidity. During the compaction granulation, good sheet was produced on startup; however there were frequent interruptions caused by stalling of the feed screw motors. Frequently the feed screws had to be freed manually and the compactor feed hopper operated at very low levels to avoid material buildup and blockage in feeding the compactor. After the trial production, dismantling the horizontal feed screws showed caked material about ¾ inch thick lining the walls of the feeder screw. After about 4 weeks of storage in sealed vapor barrier bags the materials were applied to a turf plot. It was observed that the materials had caked in the bags. The material could be rendered portable and usable by dropping the filled bags on the floor before opening. In addition to caking, the granules were damp, had expanded in diameter and were softer when compared with samples of that formulation tested immediately following production of these materials, as follows:

| Average Particle Size Analysis | Immediately following production | After 34 days storage |
|---|---|---|
| Retained on | | |
| 8 mesh | 6.2% | 20.4% |
| 18 mesh | 78.6 | 68.8 |
| 30 mesh | 13.3 | 4.8 |
| 60 mesh | 1.2 | 3.2 |
| Passing 60 | 0.7 | 3.6 |
| Attrition Resistance | 84 | 49 |
| Moisture Content | not determined | 3.8 |

Certain of the above formulations were then evaluated for ease of application and efficacy as a fertilizer or fertilizer supplement.

In another evaluation, formulation #1 was applied to a test plot adjacent to an application of a commercial complete fertilizer of 6N:24P:24K material. The #1 material required slight deagglomeration by hand before spreading.

TABLE 2

| Formulation | 1 | 2 | 3 | 4 | 5 | 6 | 7 |
|---|---|---|---|---|---|---|---|
| Urea | 44.40 | 35.60 | 35.60 | 34.00 | 44.40 | — | 10 |
| Calcium Sulphate | | | | | | | |
| Dihydrate | | 42.60 | | 39.33 | | 100 | 88.6 |
| Hemihydrate | 27.75 | | 42.60 | | 27.75 | | |
| Anhydrite | | | | | | | |
| Phosphate | | | | | | | |
| Dical | | | | | | | |
| TCP | | 9.70 | 9.70 | | | | |
| MAP | | | | 7.50 | | | |
| Other Ingredients | | | | | | | |
| Iron Chelate | 11.00 | 2.93 | | 4.46 | 11.00 | | |
| Iron Sulphate | | | 2.93 | | | | |
| Manganese chelate | 3.60 | 1.11 | | | 3.60 | | |
| Manganese sulphate | | | 1.11 | | | | |
| Zinc chelate | 3.10 | 0.36 | | 1.28 | 3.10 | | |
| Zinc sulphate | | | 0.36 | | | | |
| Copper chelate | 0.80 | | | 0.15 | 0.80 | | |
| Copper sulphate | | 0.23 | 0.23 | | | | |
| Iron Carbonate | | | | | | | 1.4 |
| Potassium sulphate | 8.35 | 7.47 | 7.47 | 7.00 | 8.35 | | |
| Surfactant | 1.00 | | | 0.75 | 1.00 | | |
| Hydrated lime | | | | 2.00 | | | |

After deagglomeration the materials spread uniformly but some lumping was observed during application. In another evaluation, application rates by drop spreader were 0, 1 and 2 lbs. of nitrogen per thousand square feet of the commercial material and 0, 25 and 50 lbs. per thousand square feet of formulation #4 onto experimental plots which had received no prior chemical treatment to a turf that was a mixture of rye and Kentucky blue grasses. The turf was cut at 4 weeks and at 7 weeks and the clippings from each of the plots were weighed to measure turf growth and reported in Table 3 as a percent increase in weight of the clippings obtained from each plot compared to the weight of clippings from untreated control plots for each formulation. The amount of greening response in the 1 lb. nitrogen plots was nearly equal to those plots having the 2 lbs. nitrogen weight application. The plots having a higher application rate retained a dark color longer and the color change and increased green response with formulation #4 persisted as long as the color and weight change in plots treated with the commercial fertilizer. In comparing the commercial soil conditioner to the nitrogen fortified gypsum soil conditioner, the plots with the 25 lb. fortified formulation treatment were judged to be almost as green as the 50 lb. plots; and the plots with the 50 lbs. retained their green longer. The fortified formulation showed average growth treated with 25 lbs. per thousand square feet equal to the yield of plots with 50 lbs. per thousand feet of the commercial soil conditioner. After the second cutting, the 50 lb. application of fortified material had a 30% more yield than the 25 lb. fortified soil conditioner plots. In addition, soil analysis was performed on the plots by sampling 3 aliquots of soil at a depth of from the surface to 15 centimeters for each of the plots. Results are set forth in Table 4. In comparing the commercial fertilizer with formulation #4 soil analysis showed no negative effect from formulation No. 1 using either rate of application. In comparing the fortified soil conditioner with the commercial conditioner, the soil analysis indicates no detrimental effects from either treatment.

TABLE 3

| Rate of Application (lb.N/MSF) | Grass Yield (as % increase compared to untreated control) | |
|---|---|---|
| | 4 weeks | 7 weeks |
| Commercial Fertilizer | | |
| 1 lb. | 20% | 34% |
| 2 lb. | 22 | 73 |
| Formulation #4 | | |
| 1 lb. | 63 | 76 |
| 2 lb. | 81 | 136 |
| Commercial Gypsum Soil Conditioner | | |
| 25 lb. | 3 | 0.4 |
| 50 lb. | 6.5 | 13 |
| Formulation #7 | | |
| 25 lb. | 29 | 43 |
| 50 lb. | 39 | 85 |

EXAMPLE 3

A number of formulations were evaluated as high non-protein nitrogen animal feed supplement rations as set forth in Table 5. When it was reasonably feasible for the particular formulation, measurements were taken of the granule's resistance to attrition (RTA), angle of repose (AR) of a conical pile of the material, and/or hygroscopicity, as set forth in the table. For comparison on hygroscopicity, prilled urea had a weight gain of 209 milligrams per square centimeter in 16 hours.

In this usage it is highly desirable to the animal feed formulator to provide a balanced ration of around 10N:1S and further desirable to provide additional calcium and phosphate. Based on the foregoing examples no formulations were made with calcium sulphate dihydrate as a calcium and sulfur source.

In the first comparisons (formulations #1 and #2), an animal feed supplement based on dicalcium phosphate as the phosphate source was extremely difficult to process even with hemihydrate or anhydrite. In small scale laboratory evaluations of a compaction granulation production of these materials, it was found that the formulations caused considerable sticking during powder feedings, difficult sticking during blending, the compacted sheet tended to melt, and the product on hygroscopicity tests gained considerable moisture and evidenced hard clumping.

Reformulating with tricalcium phosphate (formulations #3–#5) overcame stickiness in processing; and resulted in an easy flowing granule that had little tendency to pick up moisture. The processing ease and lower hygroscopicity is quite evident in the two formulations with monoammonium phosphate (formulations #5 and #6) where #5 also contains tricalcium phosphate but #6 for comparison did not contain any tricalcium phosphate. Formulation #7 illustrates that satisfactory urea-monoammonium phosphate blends may be satisfactorily compaction granulated with the calcium sulphate compounds of the invention.

TABLE 4

| Rate of Application (lb.N/MSF) | pH | Total N% | Soil Analysis at 7 weeks | |
|---|---|---|---|---|
| | | | Density gm/cc | salts mhos × $10^{-5}$/cm |
| Commercial Fertilizer | | | | |
| 0 | 7.4 | .25 | 1.25 | 25 |
| 1 | 7.5 | .25 | 1.27 | 23 |
| 2 | 7.5 | .26 | 1.26 | 27 |

TABLE 4-continued

| Rate of Application (lb.N/MSF) | pH | Total N% | Soil Analysis at 7 weeks Density gm/cc | salts mhos × 10$^{-5}$/cm |
|---|---|---|---|---|
| Formulation #4 | | | | |
| 0 | 7.5 | .24 | 1.23 | 23 |
| 1 | 7.5 | .23 | 1.24 | 25 |
| 2 | 7.4 | .25 | 1.22 | 28 |
| Commercial Gypsum Soil Conditioner | | | | |
| 0 | 7.7 | .21 | 1.28 | 23 |
| 25 | 7.6 | .21 | 1.28 | 25 |
| 50 | 7.6 | .22 | 1.28 | 27 |
| Urea + Iron Fortified Gypsum Soil Conditioner | | | | |
| 0 | 7.7 | .20 | 1.31 | 22 |
| 25 | 7.6 | .30 | 1.29 | 25 |
| 50 | 7.6 | .22 | 1.28 | 30 |

TABLE 5

| Formulation | 1 | 2 | 3 | 4 | 5 | 6 | 7 |
|---|---|---|---|---|---|---|---|
| Urea | 50% | 50% | 55% | 55% | 50% | 50% | 29% |
| Calcium Sulphate | | | | | | | |
| Hemihydrate | 15.5 | | 13.4 | | 13.4 | 13.4 | 14 |
| Anhydrite | | 15.5 | | 12.5 | | | |
| Phosphate | | | | | | | |
| Dical | 34 | 34 | | | | | |
| TCP | | | 31.6 | 32.5 | 15.8 | | |
| MAP | | | | | 20.8 | 20.8 | 30 |
| Other Ingredients | | | | | | | |
| Hydrated lime | | | | | | | 21 |
| MgO | 0.5 | 0.5 | | | | | 6 |
| Compaction Characteristics | | | | | | | |
| Feeding | S | S | Sat | Sat | Sat | S | Sat |
| Flaked sheet | melts | melts | brittle | brittle | soft | melts | hard |
| Granule RTA | 89 | 79 | — | — | — | — | 85 |
| Granule AR | — | — | 40 | 45 | 44 | bridging | Sat |
| Hygroscopicity in Mg/cm² | | | | | | | |
| 3 hours | 22.4 | 20.9 | — | — | — | — | — |
| 5 hours | — | — | 6.1 | 6.2 | 15.1 | — | — |
| 7 hours | 53.7 | 50.7 | 6.7 | 6.8 | 17.1 | — | — |

TABLE 5-continued

| Formulation | 1 | 2 | 3 | 4 | 5 | 6 | 7 |
|---|---|---|---|---|---|---|---|
| 24 hours | 104 | 103 | 18.3 | 18.7 | 48.2 | — | — |

S means "sticky".
Sat means "satisfactory".

While the compositions and method of the present invention have been described with primary reference to fertilizers and animal feed supplements, it is to be appreciated that other biologically active materials, such as for example medicines, can also be prepared. Further there has been described what is at present considered to be the preferred embodiments of the present invention, and it will be understood that various modifications and alterations may be made therein without departing from the spirit and scope of the invention as claimed. For example other inorganic base forms of micronutrients may be used instead of the preferred sulphate salt form such as pyrites as an iron source and various oxides of the micronutrients.

The invention having thus been described, what is claimed and desired to be secured by Letters Patent is:

1. A method of making a nutrient composition containing urea in granular, substantially free-flowing form consisting essentially of the steps of:
   (a) dry blending a mixture of particles passing 100 U.S. Standard mesh comprising at least about 10% by weight of urea with at least about 10% by weight of a calcium sulphate selected from the group consisting of calcium sulphate hemihydrate and calcium sulphate anhydrite;
   (b) compacting the dry blended mixture into a sheet at internal temperatures of 160°–225° F.; and
   (c) crushing the sheet to desired granular size.

2. The method of claim 1 in which the mixture further consisting essentially of about 5–40% tricalcium phosphate.

3. The method of claim 1 in which the mixture includes at least about 10% by weight of an inorganic micronutrient.

4. The method of claim 1 for making an animal feed supplement nutrient further consisting essentially of about 50–60% urea, about 35–28% tricalcium phosphate and about 15–12% calcium sulfate.

5. The method of claim 1 for making a plant nutrient further consisting essentially of about 36% urea, about 8–10% phosphate selected from the group consisting of monoammonium phosphate and tricalcium phosphate and about 35–43% calcium sulfate.

* * * * *